(12) United States Patent
Dank et al.

(10) Patent No.: US 8,434,352 B2
(45) Date of Patent: May 7, 2013

(54) TEST STAND ARRANGEMENT WITH SIMULATION MODEL OF MULTI-MASS FLYWHEEL

(75) Inventors: Matthias Dank, Graz (AT); Helmut Kokal, St. Josef (AT); Josef Mayrhofer, Graz (AT); Stephen Jones, Graz (AT); Dirk Denger, Graz (AT); Martin Schmidt, Langen (DE)

(73) Assignee: AVL List GmbH, Graz (AT)

( * ) Notice: Subject to any disclaimer, the term of this patent is extended or adjusted under 35 U.S.C. 154(b) by 315 days.

(21) Appl. No.: 12/801,580

(22) Filed: Jun. 15, 2010

(65) Prior Publication Data

US 2011/0041595 A1  Feb. 24, 2011

(30) Foreign Application Priority Data

Jun. 16, 2009  (AT) .................. GM370/2009

(51) Int. Cl.
*G01M 15/02* (2006.01)
(52) U.S. Cl.
USPC .................... 73/116.05; 73/116.04
(58) Field of Classification Search ........... 73/114.13, 73/114.15, 115.01, 115.05, 116.01, 116.02, 73/116.04, 116.05
See application file for complete search history.

(56) References Cited

U.S. PATENT DOCUMENTS

| | | | | |
|---|---|---|---|---|
| 4,466,294 A | * | 8/1984 | Bennington et al. | 73/862.13 |
| 4,899,595 A | * | 2/1990 | Warsaw | 73/862.14 |
| 5,375,460 A | * | 12/1994 | La Belle | 73/116.06 |
| 5,445,013 A | * | 8/1995 | Clayton et al. | 73/116.06 |
| 5,452,605 A | * | 9/1995 | Wilson et al. | 73/116.06 |
| 5,465,612 A | * | 11/1995 | La Belle | 73/116.06 |
| 5,986,545 A | * | 11/1999 | Sanada et al. | 340/439 |
| 6,360,591 B1 | * | 3/2002 | Carley | 73/116.06 |
| 6,651,493 B2 | * | 11/2003 | Myers et al. | 73/116.05 |
| 6,860,145 B2 | * | 3/2005 | Bergst et al. | 73/123 |

(Continued)

FOREIGN PATENT DOCUMENTS

| EP | 0098570 | 1/1984 |
|---|---|---|
| JP | 4290632 | 10/1992 |

(Continued)

OTHER PUBLICATIONS

K. Gschweitl et al., "Tools and Methods for the Hybrid Development Process," 19th Int. AVL Conference "Engine & Environment," Graz, Sep. 2007, pp. 170-180.

(Continued)

*Primary Examiner* — Eric S McCall
(74) *Attorney, Agent, or Firm* — Dykema Gossett PLLC

(57) ABSTRACT

A test stand arrangement includes at least one electric motor (4) connected to a test specimen for driving and/or loading the test specimen, and a control arrangement for the or each electric motor. In order to be able to create the connection of the drive train and vehicle simulation with the real, vehicle-specific combustion and dynamic behavior of the engine, at least one model for a multi-mass flywheel is implemented in the control arrangement, from which model at least a part of the control requirement for the or each electric motor is calculated and which model contains at least the two masses of the primary and secondary side of the multi-mass flywheel and a substitute model for the or each bow spring, and an algorithm is implemented in the control arrangement that analyzes the model for a multi-mass flywheel by means of an integrated time step method.

10 Claims, 1 Drawing Sheet

U.S. PATENT DOCUMENTS

| | | | |
|---|---|---|---|
| 7,926,336 B2* | 4/2011 | Vickio et al. | 73/116.05 |
| 2004/0200272 A1* | 10/2004 | Bergst et al. | 73/123 |
| 2006/0042365 A1* | 3/2006 | Bond | 73/117.3 |
| 2008/0190183 A1* | 8/2008 | Erlach et al. | 73/114.01 |
| 2010/0050759 A1* | 3/2010 | Vickio et al. | 73/116.06 |

FOREIGN PATENT DOCUMENTS

| | | |
|---|---|---|
| JP | 8219953 | 8/1996 |
| JP | 2002048683 | 2/2002 |
| JP | 2003057152 | 2/2003 |

OTHER PUBLICATIONS

C. Schyr et al., "Methodical Validation of Hybrid Powertrains," $2^{nd}$ Int. Dev. Methodology Symposium, Darnstadt, 2007, pp. 87-93.

Christian Beidl et al., "Enabling Future Powertrain Solutions by Innovative Simulation & Testing Toolchains," $32^{nd}$ FISITA World Automotive Conference, F2008-12-318, Munich, Sep. 2008.

Andreas Walter et al., "The DMF as a Virtual Sensor" in MTZ 0612007, vol. 68, pp. 24-27.

N. Cavina et al., "Analysis of a Dual Mass Flywheel System for Engine Control Applications," SAE 2004-01-3016, Tampa, Oct. 2004.

Andreas Walter et al., "Anti-Jerk & Idle Speed Control . . . Flywheels," SAE 2008-01-1737, 2008, pp. 1267-1276.

Andreas Walter et al., "Compensation of Sub-Harmonic Vibrations During Engine Idle by Variable Fuel Injection Control," $17^{th}$ IFAC World Congress, Seoul, Jul. 2008, pp. 9459-9466.

English Abstract of JP2002048683.
English Abstract of JP2003057152.
English Abstract of JP4290632.
English Abstract of JP8219953.

* cited by examiner

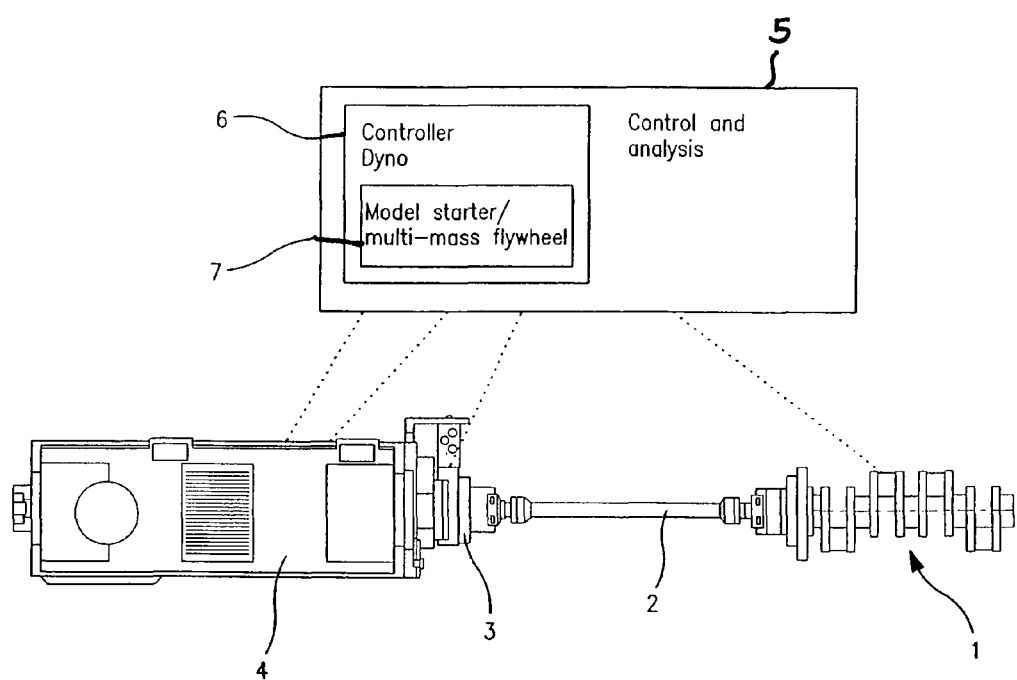

TEST STAND ARRANGEMENT WITH SIMULATION MODEL OF MULTI-MASS FLYWHEEL

BACKGROUND OF THE INVENTION

1. Field of the Invention

The invention relates to a test stand arrangement having a test specimen that is connected to at least one electric motor for driving and/or loading the test specimen, as well as having a control arrangement for the or each electric motor for driving and/or loading the test specimen.

2. The Prior Art

Rising fuel prices and statutory regulations with regard to emissions and $CO_2$, combined with higher customer expectations with regard to comfort, are leading to a continually growing demand for cost-optimized vehicles with highly innovative drive trains. For this reason, vehicle manufacturers are confronted with the challenge of developing highly complex drive train solutions in a rapid and purposeful fashion. In order to meet this challenge, a wide array of strategies has been developed, with the "front loading" of the development process on the basis of the "road to lab math" strategy having crystallized as the core strategy. Here, development tasks that earlier could only be handled in expensive prototype environments are to be transferred into early process phases such as is described, for example, in Geschweitl K., Ellinger R., Loibner E, "Tools and Methods in the Hybrid Development Process" ["Werkzeuge and Methoden im Hybrid Entwicklungsprozess"], 19th "Engine and Environment" ["Motor und Umwelt"] conference, Graz, 2007, in Schyr C. and Geschweitl K.,"Methodical Validation of Hybrid Drive Trains" ["Methodische Validierung von hybriden Antriebssträngen"], 2nd International Development Methodology Symposium, Darmstadt, 2007, or in Seidl C., Rainer G., Schoeegl P., Martini E., Dener D., "Enabling Future Powertrain Solutions by Innovative Simulation & Testing Toolchains," 32nd FISTIA World Automotive Congress, Munich, 2008. The prototype environments are to be replaced by simulation environments. However, this strategy presumes that integrated development environments are available to the developer in which he is able to take into account the overall system behavior of the vehicle as well as its interaction with its environment.

In many developments, an essential point is reproducing the behavior of a multi-mass flywheel, usually a dual-mass flywheel (ZMS), on the test stand, in particular an engine test stand. In the course of developing hybrid drive systems, the multi-mass flywheel, in particular the dual-mass flywheel, also becomes the core element for all drive trains because, along with the suitable functionality, it allows a good decoupling of the internal combustion engine and the drive train. Currently, it is possible to duplicate the actual behavior of a multi-mass flywheel only using real prototypes on a test stand. This caused dependence upon the availability of dual-mass flywheels. Examples of this may be found in publications such as Walter A., Kiencke U., Jones S., Winkler T.: "The multi-mass flywheel as a virtual sensor" ["Das Mehrmassenschwungrad als virtueller Sensor"]. MTZ June 2007, volume 68; Cavina N., Serra G.: "Analysis of a Dual Mass Flywheel System for Engine Control Applications" SAE 2004-01-3016; A. Walter, U. Kiencke, S. Jones and T. Winkler, "Anti-jerk & idle speed control with integrated subharmonic vibration compensation for vehicles with dual mass flywheels," SAE, 2008, or in A. Walter, M. Murt, U. Kiencke, S. Jones and T. Winkler, "Compensation of sub-harmonic vibrations during engine idle by variable fuel injection control," accepted for 17th IFAC World Congress, Seoul, South Korea, 2008.

However, in the case of electrical drive trains in the future, the demands on such modules for decoupling are rising. On the one hand, the fluctuations in torque are increasing and, on the other hand, the excitation frequency when the internal combustion engine is activated is decreasing. Moreover, the hybrid drive system allows and requires rapid activation and deactivation of the internal combustion engine when idling and during driving. Naturally, this should not cause any effect noticeable to the driver on the drive train or the vehicle, the shortest possible startup times should be achieved, in particular when the start is initiated by a request from the driver, adherence to all emissions regulations should be guaranteed even with a significantly increased number of startup processes and an altered warm-up behavior of the structure and exhaust system, and the accomplishment of "change of mind" scenarios is required, for example, restarting the internal combustion engine during parking. In current solutions having dual-mass flywheels, this restarting can cause damage.

The object of the present invention is therefore to provide a test stand, in particular a test stand for an internal combustion engine vehicle and/or a vehicle drive train that, while preventing the disadvantages elucidated above, is able to create the connection between the drive train and vehicle simulation and the real-world, vehicle-specific internal combustion and dynamic behavior of the engine.

SUMMARY OF THE INVENTION

This object is attained by the test stand arrangement described at the outset, which is characterized in that at least one model for a component that may be connected to the test specimen is implemented in the control arrangement, from which model at least a portion of the control requirements for the or each electric motor is determined.

According to a first advantageous embodiment of the invention, provision is made for at least one model for a multi-mass flywheel to be implemented into the control arrangement, which model contains at least the two masses of the primary and secondary side of the multi-mass flywheel and a substitute model for the or each bow spring, with an algorithm being implemented in the control arrangement that analyzes the model for a multi-mass flywheel by means of an integrated time step method. By virtue of these features, it is now possible to simulate the behavior of the multi-mass flywheel on the test stand in real time. A great advantage also lies in the fact that it is now possible to quickly and simply take into account different behavior of a multi-mass flywheel without needing to rely on the availability of prototypes.

It is advantageous for provision to be made for the algorithm to analyze the model for a multi-mass flywheel by means of an integrated time step method having fixed time steps.

According to an advantageous embodiment of the invention, provision is made for an algorithm to be implemented into the control arrangement that analyzes the elastic force and friction of the individual spring elements and of the bow spring overall in each calculation step, with the resulting forces and torques arising from the mass inertia of the individual spring elements also being analyzed and being calculated as a resulting total force and/or resulting total torque on the primary and secondary side.

It is advantageous for the model for the multi-mass flywheel to contain a parametric description of the radial rigidity of the bow spring.

An additional variant of the invention provides for the model for the multi-mass flywheel to contain a parametric representation of the contact drive behavior. An example of a parametric representation of contact friction forces is of normal force (normal) and frictional force (reib) (F_reib=F_normal*mu_reib); a similar problem could be solved in a non-parametric fashion using, for example, hertzian contact.

According to yet another embodiment according to the invention, it is possible to provide for the model for the multi-mass flywheel to contain a parametric representation of the variable overrunning clutch.

It is also advantageous if, according to another variant of the invention, the model for the multi-mass flywheel contains a state shift between traction and sliding. This state shift between, for example, traction and sliding preferably occurs via the loss or gain of a degree of freedom in the system.

In order to further improve the simulation, provision may also be made for the model for the multi-mass flywheel to contain a model for the contact mechanics at the end stops of the bow springs at the primary and secondary mass. By means of the integrated time step method and the fixed time steps of the equation solver required by the real-time application, a maximum permissible rigidity of the bow spring results. The "normal" rigidity of the bow spring (approx. 3 to 20 Nm/deg) also lies considerably below this limit. If the bow spring is compressed into a block at maximum deformation, then its rigidity attains significantly greater values (>1500 Nm/deg). This rigidity at the end stop can no longer be depicted in real time by a simulation, with the low masses of the primary and/or secondary side. Therefore, it is assumed to be infinitely rigid such that the system described is no longer a force-activated, accelerated system. The principle of linear torque also applies in the case of the end stop, i.e., an equalization of energy occurs between the faster system and the slower system in the end stop. It is therefore possible for the effect of the impact to be optimally emulated in a precise fashion.

According to another alternative embodiment, provision is made for at least one model for a starter device of the test specimen to be implemented in the control arrangement. In this manner, the greatest variety of starter characteristics may be tested without any complicated renovation work and without the danger of damaging components of the test stand arrangement or the components to be tested.

The invention shall be described in greater detail in the description below using an exemplary embodiment and with reference to the attached drawing.

BRIEF DESCRIPTION OF THE DRAWING

The drawing is a schematic depiction of a test stand arrangement, for example, a test stand for internal combustion engines such as Otto engines or diesel engines as the test specimen which is symbolized by its crankshaft.

DETAILED DESCRIPTION OF THE PREFERRED EMBODIMENT

As shown in the drawing, a test specimen 1 is connected via a shaft 2 that may include a torque measurement flange 3 to an electric motor 4 for driving and/or loading the test specimen 1. The invention may also be used on test stand arrangements including a plurality of electric motors 4, for example, on test stands for a vehicle drive train. The control and analysis unit 5, which may be a component of a superordinate test stand automation system, also includes at least one control arrangement 6 of the or each electric motor 4.

While the test specimen 1 is real, components connected thereto, for example, a drive train of a vehicle, may be replaced by simulations, for which at least one model 7 is implemented in the control arrangement 6 for such components that may be connected to the test specimen 1; the control requirement on the electric motor 4 is then calculated from this model 7. The electric motor 4 often regulates an engine speed or torque in a stationary or transient fashion even without additional simulated components, i.e., no vehicle simulation is active for the test specimen 1.

According to the present invention, at least one model 7 for an additional component that may be connected to the test specimen 1 is implemented in the control arrangement 6; up to now, this additional component would also have been present in reality as a component of the test specimen 1. This component may be, for example, a multi-mass flywheel or even a starter device for the test specimen 1. According to the invention, this component is now replaced in the simulation using virtual reality.

As parameters for a multi-mass flywheel, the model 7 comprises at least the two masses of the primary and secondary sides of the multi-mass flywheel to be simulated and a substitute model for the or each bow spring. In many cases, a massless substitute model may be advantageous. According to an algorithm implemented in the control arrangement 6 that analyzes the model 7 by means of an integrated time step method preferably using fixed time steps, the effects that the modeled multi-mass flywheel has on the test specimen 1 are now calculated and these effects are converted into control requirements for the electric motor 4. By means of this algorithm, the elastic force and friction of the individual spring elements and the entire bow spring are analyzed, with the resulting forces and torques arising from the mass inertia of the individual spring elements being individually analyzed and being calculated as the resulting total force and/or resulting total torque on the primary and secondary side.

Without the risk of damage to valuable or difficult to obtain prototypes, the effects of multi-mass flywheels on the test specimen 1 may be investigated in a systematic and highly efficient manner, said effects being particularly characterized by an increase in the rotational non-uniformity on the engine side and less rotational non-uniformity to the drive train as compared to the variant with a fixed flywheel.

The real-time simulation of the multi-mass flywheel according to the invention also allows the investigation of questions in a time- and material-saving manner regarding the effect of the behavior of the multi-mass flywheel on the test specimen internal combustion engine when starting and stopping and regarding the optimal control strategy for starting and stopping functionalities without the need to conduct experiments using a plurality of real components. Here, no expensive test vehicles are necessary, the representation of hardware changes or variants is possible in a very short time, other components may be replaced more quickly than in real vehicles, the tests are easily comparable to one another because the development environment always remains constant, and a broad range of measuring equipment may be used as needed.

The advantages mentioned above have particular significance in the development of internal combustion engines for future electrified drive trains and overall system development, i.e., the design of multi-mass flywheels as well as the specification of all associated functions in the interaction of ECU and the hybrid drive in order to attain an optimal target system. In addition, ancillary components and chain drive developments, the evaluation and validation of complex hybrid systems including their effects on the internal combustion engine by starting and stopping are a few other relevant issues.

Using various models 7 of starting devices, it is possible, for example, in the calibration of variants to reproduce a wide range of starter characteristics, for example, conventional starters, belt drive starters, flywheel mass starters, starting via DKG, etc., while conventional test stands allowed only a starter system constructed as a prototype to be tested. The interaction of the starter system and the multi-mass flywheel is also possible in a simple and risk-free manner if the model 7 contains partial models for the starter device as well as for the multi-mass flywheel and the control requirement for the electric motor 4 takes both partial models into account.

The invention claimed is:

1. A test stand arrangement comprising:
a test specimen,
an electric motor connected to the test specimen for driving and/or loading the test specimen, and
a control arrangement for calculating a control requirement for the electric motor for driving and/or loading the test specimen,
said control arrangement including a model for a multi-mass flywheel, said model containing two masses of primary and secondary sides of the multi-mass flywheel and a substitute model for a bow spring in the multi-mass flywheel, at least part of the control requirement for the electric motor is calculated from said model.

2. The test stand arrangement according to claim 1, including a model for a starter device of the test specimen.

3. The test stand arrangement according to claim 1, wherein an algorithm is implemented in the control arrangement that evaluates the model for a multi-mass flywheel by means of an integrated time step method.

4. The test stand arrangement according to claim 3, wherein the algorithm analyzes the model for a multi-mass flywheel by means of an integrated time step method having a fixed step size.

5. The test stand arrangement according to claim 3, wherein said algorithm analyzes elastic force and friction of individual spring elements of the bow spring and the entire bow spring in each calculation step, with the resulting forces and torques arising from the mass inertia of the individual spring elements additionally being analyzed and calculated as a resulting total force or resulting total torque on the primary and secondary side.

6. The test stand arrangement according to claim 1, wherein the model contains a parametric representation of a radial rigidity of the bow spring for the multi-mass flywheel.

7. The test stand arrangement according to claim 1, wherein the model contains a parametric representation of contact friction behavior for the multi-mass flywheel.

8. The test stand arrangement according to claim 1, wherein the model contains a parametric representation of a variable overrunning clutch for the multi-mass flywheel.

9. The test stand arrangement according to claim 1, wherein the model contains a state shift between traction and sliding for the multi-mass flywheel.

10. The test stand arrangement according to claim 1, wherein the model contains a model for contact mechanics at end stops of the bow springs at the primary and secondary mass for the multi-mass flywheel.

* * * * *